United States Patent [19]
Le Roux

[11] Patent Number: 6,006,297
[45] Date of Patent: *Dec. 21, 1999

[54] COMPUTER PC-CARD ABLE TO PERFORM INTERNAL PROGRAMS

[75] Inventor: Jean-Yves Le Roux, Domaine de la Cyprière, France

[73] Assignee: Gemplus Card International, Gemenos, France

[ * ] Notice: This patent is subject to a terminal disclaimer.

[21] Appl. No.: 08/865,080

[22] Filed: May 29, 1997

Related U.S. Application Data

[63] Continuation of application No. 08/441,336, May 17, 1995, Pat. No. 5,671,367, which is a continuation of application No. 07/993,607, Dec. 21, 1992, abandoned.

[30] Foreign Application Priority Data

Jan. 14, 1992 [FR] France ................................. 92 00322

[51] Int. Cl.[6] .............................. G06F 7/08; G06F 15/17; G06K 5/00
[52] U.S. Cl. .......................... 710/102; 709/200; 235/380
[58] Field of Search .................................. 395/200.3, 282, 395/283; 380/24; 235/380, 381, 382, 382.5; 340/825.34; 709/200; 710/102, 103

[56] References Cited

U.S. PATENT DOCUMENTS

| | | |
|---|---|---|
| 4,935,962 | 6/1990 | Austin .................................... 380/24 |
| 4,985,920 | 1/1991 | Seki ....................................... 380/24 |
| 5,068,894 | 11/1991 | Hoppe ............................... 340/825.34 |
| 5,296,687 | 3/1994 | Geronimi ............................... 235/380 |
| 5,671,367 | 9/1997 | Le Roux ................................ 395/282 |

*Primary Examiner*—Mark H. Rinehart
*Attorney, Agent, or Firm*—Roland Plottel

[57] ABSTRACT

The invention relates to exchangeable memory or PC-cards having several integrated circuits for personal computers.

These memory or PC-cards serve as a large capacity mass memory for replacing floppy disks and other exchangeable magnetic supports. In order to improve the possibilities of these cards, it is proposed that to them be added a microprocessor (MPC) and the direct wiring of the operational bus (BD2) of said microprocessor to the card memory (MEM). In this way, a card is obtained which contains in direct form performable programs previously loaded by the computer (PC) in which has been inserted the card. Thus, the microprocessor functions not only with an internal set program memory, but also with performable programs loaded into the card by the computer and which can therefore be modified at random (provided that the user clearance procedures are respected).

13 Claims, 2 Drawing Sheets

COMPUTER PC-CARD ABLE TO PERFORM INTERNAL PROGRAMS

This application is a continuation of application Ser. No. 08/441,336, filed May 17, 1995, now Pat. No. 5,671,367, which is a continuation of application Ser. No. 07/993,607, filed Dec. 21, 1992, now abandoned.

FIELD OF THE INVENTION

Exchangeable mass memory or PC-cards for microcomputers or personal computers (PC) have recently appeared as personal computer accessories, particularly for portable computers. In future, they could replace floppy disks and other magnetic mass storage means. They can be used as a mass memory having the same capacity as magnetic floppy disks (approximately one million bytes). Their size is no greater (credit card size with a thickness of 3 to 5 mm). They have a much faster access (several thousand times faster).

PRIOR ART

They can even be used as a program random access memory directly performable by the personal computer. However, in this case, unlike in the case of magnetic mass memories, they are not loaded into the random access memory (RAM) of the PC to be subsequently performed. The programs which they contain are directly performable by the personal computer.

Mass memory or PC-cards have several memory chips and a connector (68 pin female connector according to the PCMCIA standard of the Personal Computer Memory Card International Association, 1030B East Duane Avenue, Sunnyvale, Calif. The card can be plugged into a corresponding male connector of the computer. The connections are such that the memory can be addressed by a parallel input-output port of the PC, either as if the memory was a magnetic mass memory, or as if it was an extension of the RAM of the computer.

OBJECTS AND ADVANTAGES

According to the invention, it is considered desirable to produce the mass memory or PC-card in such a way that certain of the programs which it contains in the memory are performable by the actual card and not the computer.

This would make it possible to offer supplementary functions, particularly for carrying out and modifying application programs relative to the card. It would also make it possible to free the personal computer for other functions whilst allowing the card to perform some of these.

SUMMARY OF THE INVENTION

This is why the invention proposes a pluggable PC-card for a personal computer comprising at least one computer writing accessible memory, characterized in that it also has a microprocessor and means enabling the microprocessor to directly perform an instruction program contained in a file of the memory.

In other words, a microprocessor is provided in the card, said microprocessor being physically connected to the memories in such a way that it can directly receive therefrom on its performable instruction bus performable instructions. This microprocessor can also have its own program read only memory, more particularly containing programs for seeking in the memories of the PC-card instructions to be performed and interpretation programs for said instructions. Moreover, according to the invention, the microprocessor has direct wiring between its instruction bus and the card memory (that which can communicate with the external computer) in order to perform and not interpret a program contained therein.

The card preferably has a switching circuit for switching to the memory either the control signals from the microprocessor or the control signals from the computer in which the card is installed. During the performance of a program in directly performable code, the switching circuit only transfers to the memory the control signals from the microprocessor, whereas those from the computer do not reach the memory. However, in other operations and more particularly those consisting of loading performable files from the computer, the control signals from the computer are transmitted.

In an advantageous use example of the invention, the microprocessor participates in the performance of a security function (protection of the card against abusive use). It is then of considerable interest to have in the memory application programs performable by the microprocessor in order to ensure said security. In this way, on changing the application context, it is possible to load a new performable program. This would not be possible if the microprocessor could only perform the instructions contained in the programmable read-only memory thereof.

It is then very desirable to use security functions for exercising a control on the right of the user to modify the performable files. This preferably takes place by providing in the card a security or clearance chip able to verify by a confidential code system the clearance of the user. It is also preferable that the security system has an inaccessible file within the security chip and which contains identification "signatures" of the performable files to be protected, said signatures being informations such that the signature is modified if the file is modified. The function of the security chip would be the invisible storage and/or verification of these signatures.

BRIEF DESCRIPTION OF THE DRAWINGS

The invention is described in greater detail hereinafter relative to nonlimitative embodiments and with reference to the attached drawings, wherein show.

DETAILED DESCRIPTION OF THE PREFERRED EMBODIMENT

Figure 1:
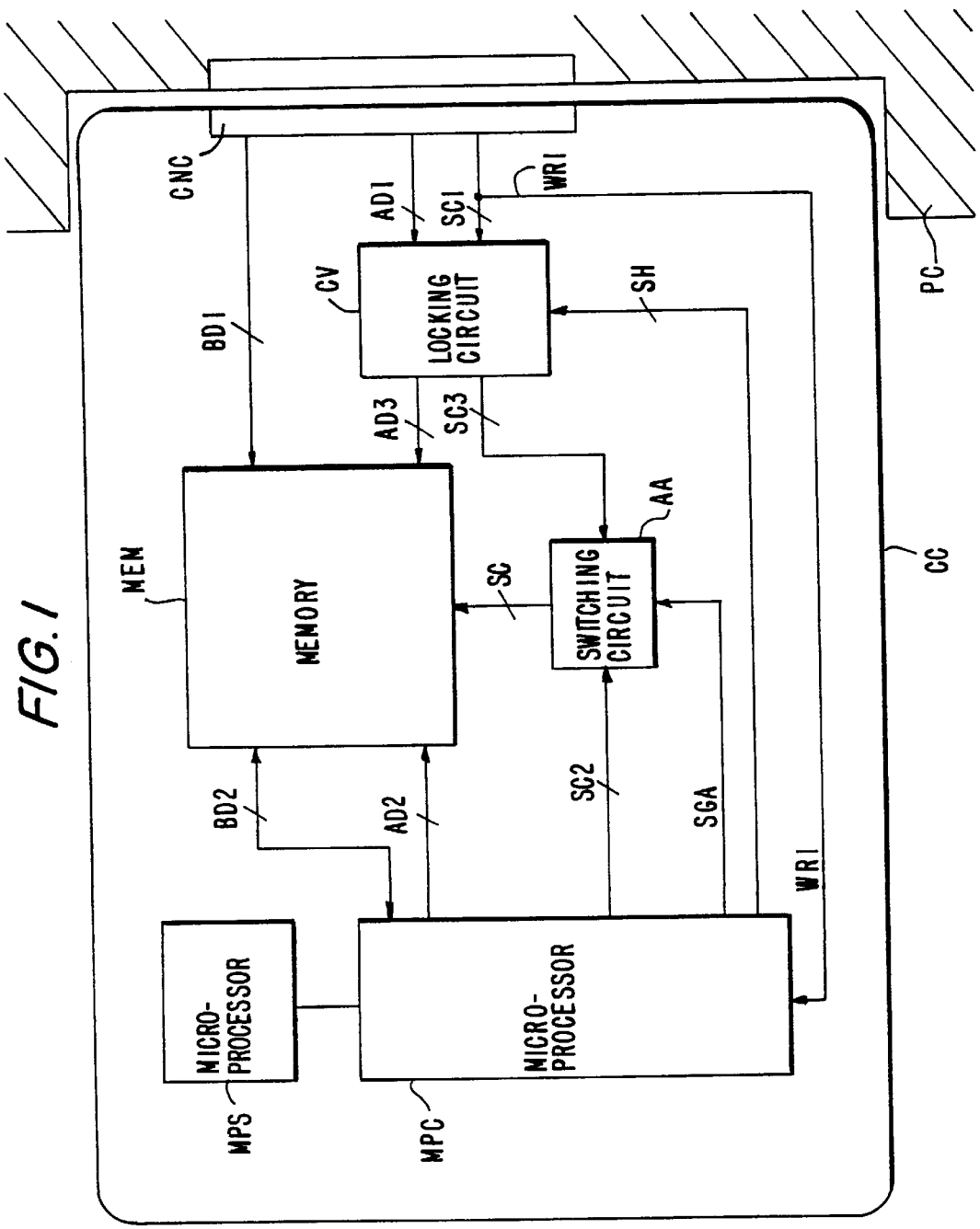
FIG. 1 The architecture of the mass memory or PC-card according to the invention.

The card CC shown in FIG. 1 is intended to be inserted in a personal computer or PC, the card having a standard pluggable connector CNC, preferably of the type defined by the PCMCIA standard and the PC has a corresponding connector for receiving the card.

The card is a memory card, i.e. it is intended mainly to serve for the storage of data. For this function, the card either has several different memory types (static or dynamic RAM, ROM, EPROM, EEPROM being the most widely used types), or a single memory type. If the memories are RAM's, which are essentially volatile, it is possible to provide a standby battery for saving the data.

In order to obtain a larger storage capacity, several integrated circuit chips are provided, each of which is a memory chip. These chips are designated overall by the reference MEM. There can be several dozen chips on the card for larger storage capacities (e.g. several megabytes).

The card CC is an exchangeable peripheral of the computer PC. It can be used either as a mass storage peripheral, or as a RAM extension. It is the computer which controls this choice (when a choice is possible, i.e. particularly when there are several memory types in the card).

At least certain areas of the memory MEM are accessible in writing by the PC. In practice, all or almost all the memory MEM is accessible in reading and writing, but provided that this is on the part of a cleared user in the case where the access security functions are provided.

Apart from the chips forming the memory MEM, the card can have other chips. For example, FIG. 1 shows a security module, which is an integrated circuit chip MPS having a microprocessor with small memories and programs for the operation of the microprocessor. The essential function of this module is to ensure the access security to the memory MEM from the computer.

According to the invention, the card CC also has a supplementary chip, which is a microprocessor MPC having varied functions (e.g. linked with the communication with the security module) and which, according to the invention, has the supplementary function of direct performance within the card of programs contained in certain areas of the memory MEM. These programs are stored in the form of directly performable operating codes in the language of the microprocessor and the operational bus of the microprocessor (bus intended to receive the instructions) is connected to an output bus of the memory MEM. The microprocessor can also have a program RCM coupled to its operational bus. However, the special feature of the invention is that this RCM (inaccessible from the PC) is not the only operational memory, because the files of the memory MEM (among the files accessible from the PC) are also performable by the microprocessor.

The memories MEM are connected to the PC by means of several buses, namely an address bus, a data bus and a control signal bus. However, these buses are preferably controlled by a locking or clamping circuit CV, which is itself controlled by the microprocessor MPC, so that the access to the memories is not completely free, except when authorization is given by the microprocessor MPC.

In the represented embodiment, it is assumed that the locking circuit CV acts on the address bus and on the control signal bus, but not on the data bus, but other solutions are possible.

This is why one has shown on the one hand a data bus BD1 passing directly from the connector CNC to the memory MEM and on the other an address bus from the connector to the memory and interrupted by the locking circuit CV. This bus is designated AD1 upstream of the locking circuit on the connector side and AD3 downstream thereof on the memory side. Finally, a control signal bus (SC1 upstream and SC3 downstream) also interrupted by the locking circuit CV is provided.

Another circuit (switching circuit AA) is interposed between the bus SC3 and the memory. Its function is to switch to the memory either the control signals of the bus SC3 coming from the PC, or the control signals of a bus SC2 coming from the microprocessor MPC and further details will be given thereon hereinafter. The control signal bus finally leading to the memory is designated SC downstream of the switching circuit AA.

As a simplified embodiment, reference can e.g. be made to the control buses SC1, SC2 or SC3 or SC transporting signals such as reading instructions (RD1, RD2, RD3, RD) or writing instructions (WR1, WR2, WR3, WR) or instructions for the selection of one chip from among several: CEa1, CEa2, CEa3, CEa for the selection of a memory chip A from among the chips A, B, C of the memory MEM or CEb1, CEb2, CEb3, CEb for the chip B, etc.

The locking circuit CV is directly controlled by a clearance bus SH from the microprocessor MPC. This bus transports passage authorization or inhibition signals with respect to the control or address signals passing through the locking circuit CV. In exemplified manner, it can be considered that there is a reading clearance signal SHR, a writing clearance signal SHW, clearance signals for each memory chip SHA for the chip A, SHB for the chip B and SHC for the chip C.

The special feature is that the clearance signals came directly from the MPC and are essentially used for ensuring access security to the memory MEM from the PC in applications where access security is required (and controlled by the microprocessor MPC and the security module MPS).

Thus, the microprocessor MPC is able to electronically and selectively prevent reading or writing access to certain parts of the card memory MEM.

In order to complete the general description of the architecture of FIG. 1, reference is made to the following points. The microprocessor MPC can access at random the memory MEN. In the simplest case said memory has a double access and this is why it is possible to see an address bus AD2 and a data bus BD2 between the microprocessor and the memory, although this solution is not obligatory and a single access memory would also be possible. Part of the data bus BD2 constitutes the operational bus of the microprocessor MPC, so that the latter can directly perform programs in an operational language stored in the files of the memory MEM. Access by the microprocessor MPC to the memory takes place with the aid of a control signal bus SC2 from the microprocessor, but, as stated, said bus passes through the switching circuit AA. This arrangement aims at permitting an operation of the microprocessor in closed circuit wit h the memory MEM during certain program phases. There is a general switching signal SGA from the microprocessor MPC, which controls the switching circuit AA. Finally, in the case where requests made by the external PC systematically pass through the memory MEM before reaching the microprocessor to be interpreted and then performed, appropriately the writing instructions WR1 from the PC are detected by the microprocessor MPC. In this way, the latter can known whether a request has been made and can optionally seek an instruction to be interpreted in the memory MEM. This is why a direct connection WR1 has been shown between the connector CNC and the microprocessor.

The locking and switching circuits CV and AA are extremely simple wired logic circuits. An example thereof is given in FIG. 2 to facilitate the understanding of the principle of the invention.

It is e.g. assumed that the access to the various memory chips in reading and writing requires the presence of chip selection or enable signals CEa, CEb, CEc for the chips A, B, C respectively and the presence of reading RD or writing WR instructions. Thus, the signals CEa, CEb, Cec in this example form the content of the control bus SC leading to the memory MEM.

Access requests are formulated by the external PC in the form of signals CEa1, CEb1, CEc1, RD1, WR1 on the bus SC1, accompanied by an address on the bus AD1. Signals SHA, SHB, SHC, SHR, SHW are present on the clearance bus SH. Each of these signals controls the opening or closing of a respective AND gate. Each of the gates receives a respective control signal. The inputs of these gates constitute the bus SC1 of FIG. 1. The outputs constitute the bus SC3 transporting or not the control signals such as received from the PC in accordance with authorizations given by the microcontroller.

Figure 2:
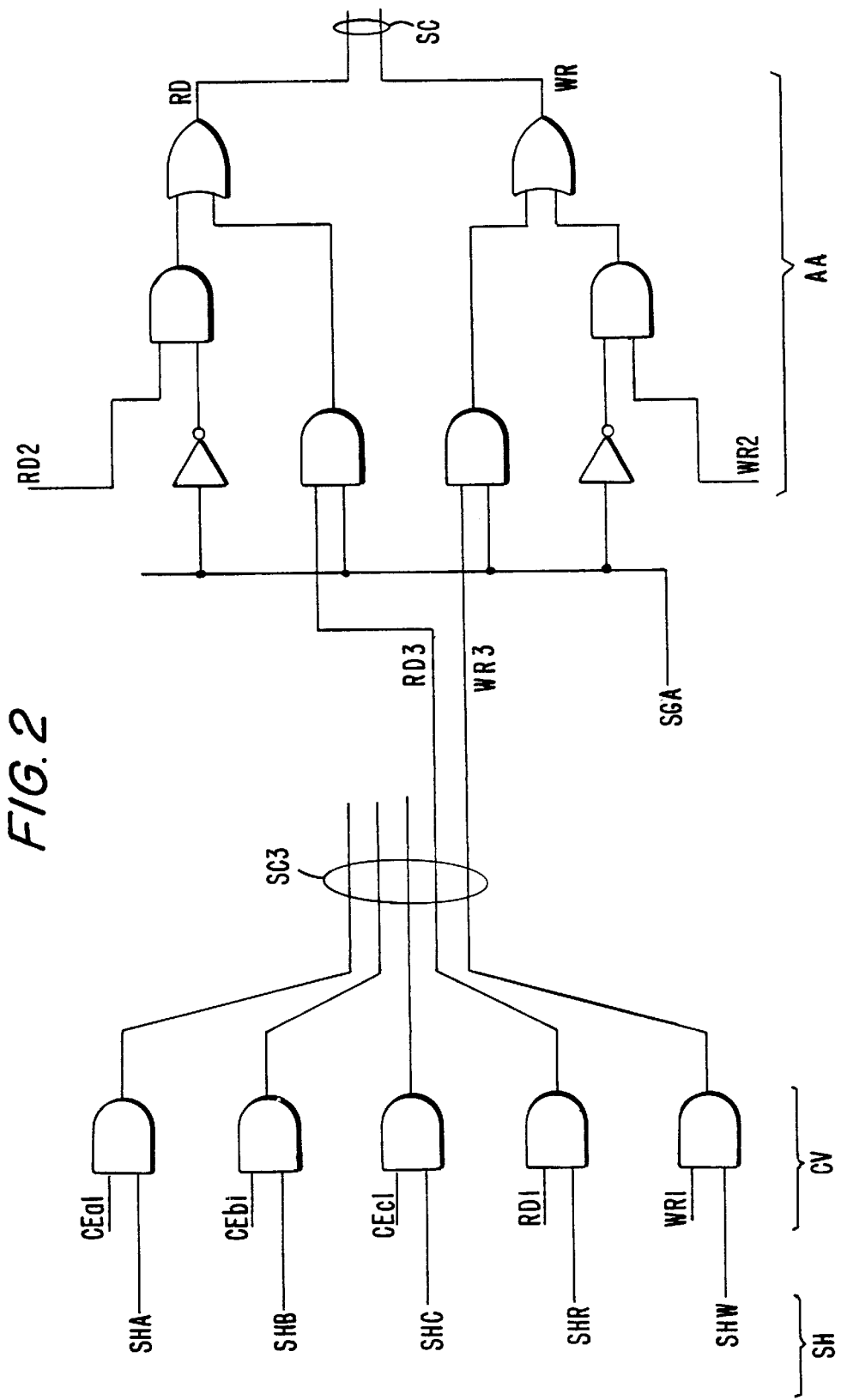
FIG. 2 A circuit detail.

The control signals transported on the bus SC3 are applied to the switching circuit AA partly shown in FIG. 2.

The switching circuit is controlled by a switching signal SGA. As a function of the state of this signal, transfer takes place to the bus SC (i.e. to the memory MEN) either of the control signals from the bus SC3 (e.g. RD3, WR3, etc.), i.e. the control signals from the PC under the control of the microprocessor, or the control signals (RD2, WR2, etc.) from the actual microcontroller.

For example, for switching reading control signals RD, an AND gate receives RD3 and is controlled by the signal SGA, whilst another gate receives RD2 and is controlled by the logic compliment of SGA, whilst an OR gate receives the outputs of these two gates and supplies the reading signal RD, said signal being either RD2 or RD3 as a function of the state of SGA.

The action of the locking circuit CV has been represented on control signals only, but it is clear that in accordance with the architecture of FIG. 1, it could also be exercised on the address bits supplied by the PC.

According to the invention, the function of the circuit AA is to make it possible for the memories to be controlled in reading and writing either by the microprocessor MPC for a direct performance of programs by the latter, or by the personal microcomputer for various operations.

According to the state of the signal SGA, these are either instructions from the PC (RD1, WR1, etc.) or instructions from the microprocessor MPC (RD2, WR2, etc.), which are retrieved and switched to the memories MEM. In this way, the memory card according to the invention can be used for more sophisticated purposes than was previously possible.

In a first conventional use, the card is used for storing programs and data to be used by the computer (transfer of said programs and data into the computer RAM). The reverse transfer is also possible, i.e. loading into the memory card new data of new programs.

In a second known use, the memory card serves as a RAM extension for a personal computer. Programs directly performable by the computer are stored in the memory MEM. The instructions are stored in directly comprehensible form by the computer central unit. They are performed by the latter without previously being loaded into the computer RAM.

In a third stage, specific to the invention, the microprocessor MPC blocks access of the control signals (RD1, WR1, etc.) by the circuit AA. The microprocessor operates directly with the memories MEM, which contain in certain areas operating codes directly performable by the microprocessor. During this time, the personal computer can continue to perform other tasks.

These directly performable instruction programs have been loaded beforehand by the computer at a time where access was again given to it by the signal SGA. Thus, these programs are located in areas accessible in writing by the PC (provided that a security clearance has been provided).

Thus, it is possible to easily modify the tasks performed by the microprocessor MPC by changing the programs which it can perform. For example, assuming that the microprocessor has the function of constituting a master processor for the security module MPS which would be a slave, in accordance with a program which can be dependent on the envisaged application, it can be seen that an application change is easy. This would not be possible if the microprocessor MPC functions solely under the control of a ROM-set program.

Hereinbefore, the memory card has been presented as a peripheral connected to the computer, but not connected to anything else. However, it can also be a communication peripheral to the outside (MODEM card, etc., control card constituting an intelligent interface with a machine). In this case, it has a supplementary connector to the outside (e.g. telephone line connection). The communication processes are controlled by the microprocessor MPC. The invention is particularly interesting in such a case, because it makes it possible to modify the programs permitting the communication, either for checking an application, or for changing the application.

The performance of a task carried out by the microprocessor can take place in the following way. A file F1 of the memory MEM contains a program written in a language directly performable by the microprocessor. This file may have been written by the PC in a previous stage. A file F2 of the memory can receive from the PC instructions (interpretable, but not performable) intended for the microprocessor. The ROM programs of the microprocessor make it possible to seek the content of the file F2 at the request of the PC and also make it possible to interpret the instructions contained in said file F2. The PC writes in the file F2 an instruction, which is the internal performance instruction of the performable program contained in the file F1. This writing by the PC is "seen" by the microprocessor MPC (connection WR1) and understood as a request to read the file F2. The microprocessor then invalidates by the signal SGA access from the PC and will then read the file F2 and individually interpret the instructions contained therein, including the order to perform the file F1. The microprocessor then jumps to the first address of the file F1 and successively performs the directly performable instructions of said file and during this time access to the memory by the PC is invalidated by the signal SGA. The end of the file F1 has an instruction to return control to the microprocessor ROM internal programs, which have the instructions for returning a state word to the file F2, said word representing the fact that the performance of file F1 is terminated. The microprocessor revalidates the access by the PC by reversing the state of the signal SGA.

It will now be shown that these new possibilities are of interest in connection with memory or PC card use security control programs, namely security against reading or writing data areas or program areas by an unauthorized user.

Access to certain memory areas (e.g. certain chips or certain chip areas) from the PC is authorized by the microcontroller MPC as a function of previously defined security criteria and as a function of confirmations given by the security module.

The security module is preferably the integrated circuit chip of the component sold by SGS-THOMSON under the reference ST16612, in which is incorporated the non-volatile memory program MCOS of GEMPLUS. This component has the following special features. The memory date are invisible for the user, because they do not pass on the chip inputs-outputs. They are also optically invisible (masked). The chip has a microprocessor and only it can seek and process data in the memory. The ROM programs are carried out by masking and can consequently not be modified. These programs do not authorize access to all the chip memory areas. When a secret clearance code is presented at the chip inputs, it is processed by the microprocessor, which in response supplies clearance or inhibition signals and at no time can the nature of the verification treatment be detected on the chip input/output terminals.

The procedure e.g. takes place in the following way. The insertion of the PC-card in the computer initiates the following operations: request by the PC for the confidential clearance code of the user, said code being introduced by the user on the PC keyboard in accordance with a standard parallel communication protocol for a PC. It is transmitted to the control microprocessor MPC of the card and retransmitted by the latter to the security module MPS in a format comprehensible for the latter (consequently in principle in series form on the single input/output terminal available on the chip MPS). The security module verifies the confidential code and transmits to the microprocessor MPC a control word representing the state of the authorizations given (total inhibition, total authorization, partial authorization of certain memory areas). The control microprocessor MPC receives this word in serial form and then establishes on the bus SH the corresponding clearance signals (SHA, SHB, SHC, SHR, SHW . . . ), which control the access to the various memory chips. The microprocessor MPC then returns to the PC a state word indicating that the security procedure has been performed and indicating the result of this procedure.

In this system it is clear that it is the microprocessor MPC which controls the PC-card security programs. It defines the authorizations and inhibitions and uses the security module as a specialized member for checking a clearance by confidential code. No access security operation is controlled by the PC.

In a reinforced security structure, the data stored in the memory are encoded by means of a secret key. The secret decoding key is not known to the user and is contained in the security module. On presentation of a valid clearance code, the security module supplies the secret key to the microprocessor MPC, which can then carry out a decoding program with respect to the memory data and transmit them to the PC in decoded form. It is thus ensured that the data stored in the memory cannot be usefully copied by an unauthorized person. The recording of the data in the memory can also take place in encoded form using the same encoding key and once again only after recognizing the user's clearance.

It should be noted that data are not outputted in case in certain is the case in certain security applications and instead the data stored in the PC-card are encoded so that any copy thereof would not be usable by someone without a clearance to do this.

Thus even on fraudulently setting the signal SGA or the signals RD, WR for reading the data of the card, it would still be impossible to utilize said data.

In this use of the circuits MPC and MPS for controlling the security of the card, it is clear that the invention makes it possible to modify the programs controlling this security. Use is made of files such as F1 of the memory MEM in order to position there directly performable programs, rather than use a set ROM of the microprocessor MPC. Thus, it is possible to modify the security control programs as a function of the application, whilst retaining the sane microprocessor MPC and the sane security module MPS.

However, as the control of security presupposes that the unauthorized user cannot easily modify the security control programs, it is possible to provide reinforced security measures for the protection of performable files such as F1.

A description will now be given of one method for obtaining this increased security. With each performable file to be protected is associated a particular "signature", which represents said file and which is deteriorated if the file is modified. This signature is formed from the actual file content, i.e. it is the concatenation of all the file bits. This signature is stored in a non-volatile and non-accessible memory (invisible for the user) of the security module. When the file has to be used and particularly when it will use a program performable by the microprocessor MPC, a check will firstly be made to ensure that there has been non deterioration of the file. If the file has been damaged, its use will be prevented. For this purpose, the microprocessor will firstly recalculate the signature of the file to which it has access and will ask the security module what is the expected signature. It will then make a comparison and will only validate use if the signatures correspond. The comparison could take place within the security module. Within the security module there can be the sane number of store signatures as there are files to be protected. Thus, in the security module there is an "image" of the files to be protected of the memory MEM, in the form of a file of signatures corresponding to the various parts to be protected. Any deterioration invalidates the use of the card. The control programs of said reinforced security system (signature calculation, signature comparison and similar programs) are at least partly in the set programs (inaccessible by the PC) of the microprocessor MPC or the security module MPS.

I claim:

1. Pluggable memory card (CC) for a computer, comprising at least one memory (MEM) accessible in writing by the computer via a data bus and an address bus connected to the computer, also comprising a microprocessor (MPC) and means (BD2, AA) for the direct performance by the microprocessor of an instruction program contained in the accessible memory.

2. An external memory card (CC) attachable to a computer, comprising entirely within the card: at least one memory (MEM) accessible by the computer via a data bus, and an address bus connected to the computer, also comprising a microprocessor (MPC) and means (BD2, AA) for directly executing an instruction program contained in said accessible memory.

3. An external memory card (CC) attachable to a computer, comprising entirely within the card: at least one memory (MEM) accessible by the computer via a data bus, and an address bus connected to the computer, also comprising a microprocessor (MPC) and means (BD2, AA) for directly executing an instruction program contained in said accessible memory said means being able to control (or block) access to said instruction program by the PC.

4. An external memory card according to claim 2, wherein said memory card is a PC-card (or mass memory), said PC-card being attachable to a computer by a PCMCIA connector.

5. An external memory card according to claim 3, wherein said memory card is a PC-card (or mass memory), said PC-card being attachable to a computer by a PCMCIA connector.

6. An external memory card according to claim 2, wherein said memory card is attachable to a PC in order to be addressed by a parallel input-output port of the PC.

7. An external memory card according to claim 3, wherein said memory card is attachable to a PC in order to be addressed by a parallel input-output port of the PC.

8. An external memory card according to any one of claims 2–7, wherein said memory card is a PC-card said memory card being attachable to a computer by a 68 pin female connector.

9. An external memory card according to claim 2, wherein the means for performing in direct manner a program comprise an operational bus (BD2) of the microprocessor, said bus being directly connected to an output bus of the memory (MEM).

10. An external memory card according to claim 2, wherein the means for the direct performance of a program comprise a switching circuit (AA) controlled by the microprocessor for supplying control signals (SC) intended for the memory (MEM), said switching circuit receiving the control signals to be switched to the memory, on the one hand from a computer in which is inserted the card and on the other from the microprocessor.

11. An external memory card according to claim 2 comprising card access security control programs in a performable file accessible from the memory (MEM).

12. An external memory card according to claim 6 or 7, where programs for calculating and comparing signatures of performable files are contained in inaccessible program memories.

13. An external memory card according to claim 2 or 3 comprising a supplementary connector to the outside.

* * * * *